United States Patent [19]

Vainerman et al.

[11] Patent Number: 5,494,939
[45] Date of Patent: Feb. 27, 1996

[54] POROUS POLYMER MATERIAL AND PROCESS FOR PRODUCTION THEREOF

[75] Inventors: Efim S. Vainerman, Moscow; Irina B. Portnaya, Moskovskaya oblast, both of Russian Federation

[73] Assignees: A. H. Hides; a part interest; Skins Australia Pty Ltd., Victoria, Australia

[21] Appl. No.: 129,102

[22] PCT Filed: Jan. 31, 1992

[86] PCT No.: PCT/RU92/00023

§ 371 Date: Jan. 10, 1994

§ 102(e) Date: Jan. 10, 1994

[87] PCT Pub. No.: WO93/21263

PCT Pub. Date: Oct. 28, 1993

[51] Int. Cl.[6] .................................................. C08J 9/28
[52] U.S. Cl. ............................ 521/64; 264/42; 521/62; 521/65; 521/84.1; 521/146; 521/147; 521/149; 521/150
[58] Field of Search .................................. 521/62, 64, 65, 521/84.1, 146, 147, 149, 150; 264/42

[56] References Cited

U.S. PATENT DOCUMENTS 3,634,184  1/1972  Wang ........................................ 521/64

3,852,224  12/1974  Bridgeford ............................. 521/62
4,506,037  3/1985  Suzuki et al. .......................... 521/65
4,590,022  5/1986  Cioca et al. ........................... 521/65
5,120,594  6/1992  Mrozinski .............................. 521/64
5,252,620  10/1993  Elliott, Jr. et al. ................... 521/64

FOREIGN PATENT DOCUMENTS 0209726  1/1987  European Pat. Off. ..
2816037  3/1978  Germany .
2530657  12/1984  Germany .

*Primary Examiner*—James J. Seidleck
*Assistant Examiner*—John M. Cooney, Jr.
*Attorney, Agent, or Firm*—Ladas & Parry

[57] ABSTRACT

The material contains interrelated micro- and anisodiametric macropores which latter are disposed mainly on peripheral portions. The volume ratio of micro- and macropores is 1:3–7.

The process involves freezing a polymer dispersion at a temperature ensuring a 3–11:1 ratio of dispersed phase to the noncrystallized dispersion medium, seasoning the conjugate-dispersed system at a temperature and within a time sufficient for reversal of phases, followed by thawing. The used polymer dispersion contains a liquid crystallizable dispersion medium and a polymer phase capable of autohesion at temperatures below the initial melting temperature of crystals in the dispersion medium.

15 Claims, 5 Drawing Sheets

POROUS POLYMER MATERIAL AND PROCESS FOR PRODUCTION THEREOF

This application is a 371 of PCT/RU92/00023 filed Jan. 23, 1992.

FIELD OF ART

The present invention relates to a porous polymer material and a process for its production from polymer dispersions.

BACKGROUND OF THE INVENTION

Widely known in the prior art are the processes for the production of polymer materials involving coagulation of polymer dispersions by ionic deposition, electrodeposition, drying and thermosensibilization. The indispensable prerequisites for implementation of these processes include constant properties of polymer dispersions, high concentration of polymer dispersed phase from 40 to 60 wt.-%, strict control of temperature and time parameters, employment of coagulants.

These processes are good mainly for the production of polymer films. Control of structure and, consequently, physicomechanical properties of such materials in the desired direction is hardly attainable due to the technological difficulties in maintaining said parameters within the necessary interval.

Known in the prior art is a process for the production of a microporous polymer leather-like watertight sheet material (U.S. Pat. No. 3,376,158) which involves applying an aqueous polymer dispersion-latex to a porous flexible fibrous substrate, coagulating polymer latex by freezing at minus 100° to minus 10° C., and drying the resulting product.

The process envisages treatment of polymer latexes capable of coalescing within a temperature interval from 10° to 100° C. and characterized by a secant module which is not under 22 Pa at a 5% tension. Concentration of the polymer dispersed phase ranges from 10 to 75 wt.-%, when a layer of latex 0.07 to 2.3 mm thick is deposited on the fibrous substrate. Before depositing, the latex is thickened to 10–40 P with caseinate and ammonium alginate, methyl cellulose and sodium polyacrylate. The polymer latex is also treated with crosslinking agents, accelerators and crosslinking activators, thickeners and fibrous additives. All these ingredients, particularly in presence of an additional destabilizing factor, in this case freezing, tend to create an orderly structure and speed up this process, thus forming a microporous polymer structure. It should be noted, that this structure is also largely defined by the structure of the porous fibrous substrate to which latex is applied.

In realizing the above process, freezing and resulting coagulation form a discrete polymer structure on the substrate. Owing to the effect of crosslinking agents and the coalescing capacity of the used polymers said structure is transformed by drying into a thin polymer coating of irregular thickness. This structure is then improved by repeated deposition of latex on the resulting polymer coating, followed by freezing and drying.

The above-described process denies the possibility of directional control over the structure of the microporous polymer material since freezing combined with the use of above-mentioned additions exerts but a destabilizing effect, so that said structure depends predominantly upon the structure of the fibrous substrate and the drying conditions. The irregularity of thickness of the material structure is apt to impair the physicomechanical properties.

There is another known process for the production of a porous polymer material in the form of a silicone elastomer sponge with mostly closed pores from an aqueous polymer dispersion-emulsion of polyorganosyloxane with pH=9–11.5 and a molecular weight over 10.000 in the presence of calloidal silica and an organic compound of tin (EP, 0097914). This process involves freezing of the silicone emulsion to form a conjugate-dispersed polymer system in the form of an article, thawing said article to produce a wet elastic sponge article, and drying the wet article until water is removed therefrom.

The silicone elastomer sponge is produced from a concentrated emulsion of polyorganosyloxane (30–60 wt.-%) which is frozen at minus 18° C. for 24 h followed by thawing the frozen article at room temperature for 6 h and drying it at 70° C. It should be noted that a mandatory prerequisite for sponge production is the use of emulsion containing a filler (colloidal silica) and an organic compound of tin.

The filler forms the structure of emulsion due to sorption of polyorganosyloxane which reacts with the organic tin compound, ensuring the formation of sponge polymer structure at freezing-thawing stages. To enhance uniform distribution in the emulsion, the filler is introduced in the form of a stabilized aqueous dispersion of silica which later will ensure a more regular structure of silicone elastomer sponge. It is precisely the filler and the organic tin compound which allow the sponge structure of the article to be fixed before drying. The closed-pore silicone elastomer sponge is produced only when drying a wet sponge article whose wet polymer walls of pores stick partly together. The sticking effect shows itself to a maximum when producing film-like specimens whose porosity can be improved by forming the emulsion before freezing.

The process referred to above is simple from the viewpoint of technology and releases no toxic materials. However, said process fails to change the structure of silicone sponge within broad limits to suit various applications. This is attributable to the fact that freezing is a destabilizing factor which favours coagulation of polymer dispersion so that the structure of sponge depends on stability of emulsion, molecular weight of polymer, the quality and quantity of the filler and organic tin compound. The effect of these parameters denies the possibility of producing silicone sponge with a regular structure throughout its volume, and with valuable physicomechanical properties.

SUMMARY OF THE INVENTION

The main object of the invention resides in providing a porous polymer material whose structure would endow it with the required properties for various applications, and in developing a process for the production of porous polymer materials by changing the freezing and thawing conditions and using a polymer dispersion whose components would enable the structure and properties of the produced material to be regulated within a broad range.

This object is achieved by providing a process for the production of a porous polymer material involving freezing a polymer dispersion to form a conjugate-dispersed polymer system followed by treating it to form a porous polymer material wherein, according to the invention, the polymer dispersion being frozen contains a liquid crystallizable dispersion medium and a polymer dispersed phase capable of autohesion at a temperature lower than the initial melting point of the crystals of the dispersion medium, wherein freezing is carried out at a temperature sufficient for obtaining a conjugate-dispersed polymer system with a volume ratio of the polymer dispersed phase to the noncrystallized dispersion medium varying from 3–11 to 1 and wherein the conjugate-dispersed polymer system is treated by holding it at a temperature below the initial melting point of crystals in the dispersion medium within a time period sufficient for reversal of phases in which the polymer dispersed phase is transformed into a dispersion medium and the dispersion medium into a dispersed phase thus forming a reversed conjugate-dispersed polymer system which is thawed at a temperature higher than the initial melting point of crystals in the dispersed phase until a porous polymer material is produced.

The disclosed process is characterized by technological simplicity, allows the porous polymer materials to be produced from dispersions with a low concentration of polymer (down to 0,1 wt.-%) and from mixtures of dispersions of various polymers. In realizing the disclosed process the structure of porous polymer materials is regulated and their properties (elasticity, hardness) are changed to suit the prospective application both by changing the parameters of treating the source polymer dispersions and by combining dispersed polymers having different characteristics with functional additions. The disclosed process provides for forming a porous polymer structure of the material without introduction of fillers, crosslinking, thickening and other additions into polymer dispersions. The process according to the invention is free of any harmful fumes and toxic substances.

The mechanism for forming the polymer structure of the material, according to the invention, depends on changes in the aggregate state of the dispersion medium and on the development of phase contacts between polymer particles. The first of these factors influences the macrostructure of the material while the second one allows it to be formed and influences its microstructure. It should be noted that the properties of polymer do not change irreversibly in the disclosed process. The material is structurized mainly while the polymer dispersion is being frozen to a conjugate-dispersed system and held at a temperature below the initial melting point of crystals in the dispersion medium within the time period sufficient for phase reversal.

According to the invention, the polymer dispersion being frozen contains a liquid crystallizable dispersion medium and a polymer dispersed phase which is capable of autohesion at a temperature below the melting point of crystals in the dispersion medium. The term "autohesion" shall be understood as development of interaction between the molecules in the surface layers of condensed phases. The ends or middle portions of molecular chains of a polymer located on the surface of one polymer particle and taking part in heat motion penetrate into the surface layer of another polymer particle. This interdiffusion may establish a sufficiently strong bond between particles thus establishing a phase contact. A rise of temperature and a longer time of contact between polymer particles favours the formation of stronger autohesion contacts between polymer particles. The disclosed process utilizes mostly the polymer dispersions wherein the polymer dispersed phase is formed by at least one polymer chosen from a group including polyisoprene, polybutadienestyrene, polymethylstyrene, polybutadienenitrile, polyacrylonitrile, or by a collagen. The material according to the invention is produced mostly from a polymer dispersion with a concentration of polymer dispersed phase ranging from 0.1 to 65 wt.-%.

Formation of the macrostructure of the material according to invention is associated with the size and shape of crystals in the dispersion medium which depend on the freezing temperature of the polymer dispersion. Freezing is conducted at a temperature sufficient for producing a conjugate-dispersed system wherein a volume ratio of polymer dispersed phase to noncrystallized dispersion medium is within a range of 3–11:1. The volume of noncrystallized dispersion medium is found from a difference between the volume of the dispersion medium in the source polymer dispersion and the volume of the liquid contained in the pores of the material obtained after thawing. The volume of said liquid is determined experimentally by the corresponding salient point on the curve representing the kinetics of drying the material specimen at 70° C. Freezing of the polymer dispersion results at first in a general concentration of dispersion with respect to polymer phase due to partial freezing out of the dispersed medium then, in the course of further freezing and crystallization in the volume of dispersion, in an additional local concentration of the dispersed phase. Thus, the polymer dispersion is frozen not to the point of complete freezing-out of the dispersed medium but to a certain relation between the polymer phase and noncrystallized dispersion medium. Crystallization of the dispersed medium in the volume of dispersion is marked by convergence of particles in the regions of noncrystallized dispersion medium between the growing crystals concentration benefits the formation of pin-point contacts between the particles of the polymer dispersed phase. The attainment in the noncrystallized liquid of the concentration of polymer particles corresponding to the formation of chains of multiple pin-point contacts between the particles of the polymer dispersed phase is one of the prerequisites for the subsequent reversal of phases. If the relation of the polymer dispersed phase to the noncrystallized dispersed medium is less than 3:1, the pin-point contacts between the particles will be either local of absent whatsoever. Thawing of such a system produces a polymer dispersion resembling the sourse dispersion wherein the particles of the dispersed phase are not fixed to one another. If, however, the relation of the polymer dispersed phase to the noncrystallized dispersed medium is larger than 11:1, the particles will be distorted by pressing into one another which eventually will result in the formation of grainy coagulum. It should be pointed out that a certain optimum relation between the polymer dispersed phase and the noncrystallized dispersed medium has been experimentally established for each polymer dispersion depending on the particle size of the dispersed phase and the degree of polydispersity of the system. The smaller the particles of the polymer dispersed phase and the higher the degree of polydispersity of the polymer dispersion, the greater this relation will be. It is desirable that the polymer dispersion be frozen within a −8° C. to −70° C. temperature bracket. The upper limit (−8° C.) is determined by the initial melting point of crystals of the dispersion medium in the system while the lower one (−70° C.) depends on the low mobility of the polymer dispersed phase in the course of freezing. It is expedient that the polymer dispersion to be frozen should contain mostly water and water-soluble additions or be constituted by an aqueous solution of an organic liquid capable of crystallizing, for example an aqueous solution of dimethylformamide. It follows from the above that changing the freezing temperature of polymer dispersion in the above-stated limits and varying the composition of the dispersion medium one can regulate the macrostructure of the polymer porous material according to the invention. Final forming of the porous polymer structure occurs during development of phase contacts between polymer particles. This takes place at the seasoning stage of the conjugate-dispersed polymer system at a temperature which is below the initial melting point of crystals of the dispersion medium within the time sufficient for phase reversal in which the polymer dispersed phase is transformed into the dispersion medium and the dispersion medium, into the dispersed phase. The phase reversal occurs only when the pin-point contacts between polymer particles develop into phase contacts due to autohesion of polymer particles. It has been found from experiments that not all polymer particles are capable of autohesion at freezing temperatures of the dispersed medium. Thus, when polystyrene latexes are frozen in the above-mentioned temperature interval, the absence of autohesion capacity due to a low mobility of the portions of molecular chains prevents the development of phase contacts between the particles and there occurs no phase reversal. It should be noted that the mobility of macromolecules of a polymer distributed in the liquid phase in the form of particles of colloidal size must not be identified with their mobility en masse since the freedom of rotation of chain segments disposed at the periphery of polymer particles is not retarded by intermolecular interaction undergone by the chain segments in the volume of polymer particles. The depth of autohesion contact depends on the nature of the polymer dispersed phase and the conditions of seasoning the conjugate-dispersed polymer system, i.e. temperature and time. It is desirable that the conjugate-dispersed system should be seasoned at a temperature which is 5°–60° C. lower than the initial melting point of crystals of the dispersion medium. This is the temperature at which the particles are not yet fixed relative to one another and retain their autohesion capacity which ensures the reversal of phase. The autohesion contact can be intensified by using a polymer dispersion which contains a crosslinking agent, an inorganic or organic filler in the amount of 1 to 250 pts wt per 100 pts wt of the polymer dispersed phase. The inorganic filler may be calcium carbonate, kaolin, titanium dioxide while the organic filler may be represented by coloring pigments, lignin, cellulose fibers. The fillers can be introduced in the form of powders or suspensions. The depth of autohesion contact influences to a certain extent the structure of the porous polymer material (nature and size of pores) and its strength. The use of crosslinking agents and fillers strengthens even shallow autohesion contacts between polymer particles and expands the range of applications of the produced materials. The duration of seasoning the conjugate-dispersed system depends on the nature of polymer and may vary for each particular system depending on the depth of autohesion contact between polymer particles. The seasoning temperature of the conjugate-dispersed system before reversal of phases may be equal to, or higher than, the freezing temperature but it must not be higher than the initial melting temperature of crystals in the dispersion medium. Seasoning of the conjugate-dispersed system at higher than the freezing temperature is expedient for intensifying interdiffusion between particles and the chemical processes which may take place if the system has been treated with crosslinking additions or fillers. Such a treatment turns the conjugate-dispersed system into a reversed conjugate-dispersed system wherein the polymer dispersed phase is transformed into a dispersion medium while the dispersion medium is transformed into a dispersed phase. Reversal of phases in the polymer dispersion in the course of its freezing and seasoning is the basic prerequisite for realizing the process according to the invention since the porous polymer material is formed just at these stages.

After seasoning, the reversed conjugate-dispersed system is thawed at a temperature higher than the initial melting point of crystals in the dispersed phase. As a result, the pore space is freed of liquid resulting from transformation of the dispersed phase. To intensify removal of liquid from the pore space of the material it is desirable that the thawing stage should include heating of the reversed conjugate-dispersed system. If the porous polymer material is to be compacted by partial changes of its macrostructure, it is practicable that thawing should be conducted at room temperature until the reversed conjugate-dispersed system turns into a wet porous material. Then the material should be subjected to compulsory syneresis at a surplus unit pressure of 0.01–2.0 Pa and seasoned while heating. Changes of macrostructure are still possible at this stage since the wet porous material is sufficiently plastic and retains a certain capacity of irreversible deformation. To broaden the field of application of the porous polymer material it is desirable that the polymer dispersion should contain cells of microorganisms. The immobilized cells do not lose their productivity, i.e. fermenting activity. Such a material will prove its worth in food or medical industries.

The problem is also solved by disclosing a porous polymer material having interrelated micro- and anisodiametric macropores in which said macropores are located mainly on peripheral sections of its thickness, the volume ratio of micro- and anisodiametric macropores being 1:3–7.

The disclosed material is produced by the process according to the invention and can have the form of a film or a three-dimensional article. Its pores vary from 0.01 to 10 mm in size. The shape and size of pores can be regulated by the nature of the polymer dispersed phase, concentration of the polymer dispersion, composition of the dispersion medium and content of functional additions in the dispersion.

The material according to the invention is noted for a high elasticity owing to the above-mentioned volume ratio and appropriate arrangement of micro- and anisodiametric macropores which ensure different deformation throughout the thickness of the material. This material is sufficiently strong and will be used to advantage in the manufacture of sports and orthpaedic footwear.

To expand the field of application, it is expedient that the porous polymer material according to the invention should contain a liquid, mostly water, enclosed in micro- and anisodiametric macropores. This material will also prove useful in the manufacture of cosmetic prosthetic appliances.

BRIEF DESCRIPTION OF THE DRAWINGS

For better understanding of the present invention, it will now be described by way of its concrete embodiments with reference to the accompanying drawings in which.

BEST MODE OF CARRYING OUT THE INVENTION

Figure 1A:
FIGS. 1–5a, b illustrate the scanning electronic photomicrographs of the central and peripheral sections, respectively, of the porous polymer material for the specimens produced in keeping with examples 1–4, 5, 7, 25 according to the invention. To show the scale, the small line in the lower right-hand part of the photomicrograph in FIGS. 1a, b corresponds to a length of 10.0 um while in FIGS. 2–5a, b, to a length of 100.0 um.

The porous polymer material is produced from a polymer dispersion wherein the polymer dispersed phase is represented by polybutadiene styrene containing 30% of styrene units. Concentration C of the polymer dispersed phase (C d.ph.) is 20 wt.-%. The dispersion medium is, basically, water with a small amount (up to 0.05 wt.-%) of dissolved potassium paraffinate which is a surface-active stabilizer of polybutadienestyrene aqueous dispersion. The initial melting point ($T_m$) of crystals in the dispersion medium found from a thermogram is minus 0.28° C. A 200-g. amount of polymer dispersion is poured into a flat open glass container and placed into a cooling cabinet at minus 60° C. where it is frozen for 0.5 h until a conjugate-dispersed system is formed in which the volume ratio of the polymer dispersed phase ($V_1$) and noncrystallized dispersion medium ($V_2$) is 5.9:1. The resulting conjugate-dispersed polymer system is seasoned at minus 60° C. for 3.5 h to the point of phase reversal which marks the formation of a specimen from the reversed conjugate-dispersed system. The weight of the produced specimen is determined by weighing it in a container closed by a tightly ground stopper. To thaw a specimen, the container without stopper is placed into a controlled-heat cabinet at 70° C. and weighed periodically at 15-min intervals. The obtained data are used for plotting a chart showing the loss of specimen weight in time due to evaporation of liquid. As all liquid has evaporated from the pore space, there appears a salient point on the kinetic curve. The value of the ordinate corresponding to said salient point is 153 g (153 ml). The difference between the volume of the dispersion medium in the source system (160 ml) and the volume of the liquid in the pores of the porous polymer material produced after thawing is 7 ml ($V_2$). The volume of the polymer dispersed phase is about 41 ml ($V_1$), the density of the polymer phase being 0.98 g/cm³. Hence, the volume ratio of the polymer dispersed phase to the noncrystallized dispersion medium is 5.9:1. The material produced after thawing has interrelated micro- and anisodiametric macropores, the former being disposed mostly in the central section and the latter ones, on the peripheral portions of its thickness (20 mm).

The volume ratio of micro- and macropores found experimentally by geometric measurements is 1.5. The apparent density of the material ($\rho_r$) determined to its volume is 0.385 g/cm³.

The mechanical properties of the dried material are estimated by the parameter of instantaneous deformation ($\epsilon_1$) measured on a laboratory penetration tester under a force of 5N. This deformation of the resulting material is 3.5 mm.

Given hereinbelow in the Table are other examples of producing a porous polymer material according to the invention, stating the characteristics of the polymer dispersion, technological parameters of the disclosed process and characteristics of the produced material. In the specimens of Examples 1–25 the volume ratio of the polymer dispersed phase to the noncrystallized dispersion medium as well as the parameters of the material are determined as described above. The specimens are 20-mm thick except those of Examples 3, 6 which are films 1-mm thick.

TABLE

| | | Characteristics of Polymeric Dispersion | | | | |
| | | | | | Functional additions | |
| Example No. 1 | Dispersed polymeric phase (composition) 2 | C of dispersed phase 3 | Dispersion medium (composition) 4 | Initial melting point °C. 5 | Composition 6 | pts wt per 100 mol. pts of polymer 7 |
| --- | --- | --- | --- | --- | --- | --- |
| 1 | Polybutadienestyrene with 30% of styrene units | 65 | Mainly water traces of stabilizing surfactant | −0.32 | | |
| 2 | Polybutadienestyrene with 30% of styrene units | 10 | Mainly water traces of stabilizing surfactant | −0.28 | | |
| 3 | Polybutadienestyrene with 30% of styrene units | 0.1 | Mainly water traces of stabilizing surfactant | −0.25 | | |
| 4 | Polyisoprene-polymer of natural latex-Quality | 45 | Latex serum mainly water | −0.50 | | |
| 5 | Polyisoprene-polymer of natural latex-Quality | 10 | Latex serum mainly water | −0.40 | | |
| 6 | Polyisoprene-polymer of natural latex-Quality | 0.1 | Latex serum mainly water | −0.33 | | |
| 7 | Mixture of equal parts of 30% polybutadienestyrene with polymer of natural latex-Qualitex, 1.1 | 10 | Natural latex serum, traces of stabilizing surfactant, mainly water | −0.40 | | |
| 8 | Carboxylated polybutadienestyrene with 30% of styrene units and 3% of carboxyl groups | 20 | Mainly water, traces of stabilizing surfactant | −0.35 | | |
| 9 | Carboxylated polybutadienesty- | 20 | Mainly water, traces of | −0.35 | | |

TABLE-continued

| | | | | | | |
|---|---|---|---|---|---|---|
| | rene with 65% of styrene units and 1% of carboxyl group | | stabilizing surfactant | | | |
| 10 | 70% polybutadienestyrene | 20 | Mainly water, traces of stabilizing surfactant | −0.30 | | |
| 11 | Polymethylstyrene with 50% of styrene units | 20 | Mainly water, traces of stabilizing surfactant | −0.30 | | |
| 12 | Carboxylated polybutadienenitrile, 40% of nitrile units and 4% of carboxyl groups | 20 | Mainly water, traces of stabilizing surfactant | −0.50 | | |
| 13 | Copolymer of acrylnitrile acid with vinylacetate | 20 | Mainly water, traces of stabilizing surfactant | −0.60 | | |
| 14 | Mixture of equal parts of 30% polybutadienestyrene and copolymer of acrylonitrile acid with vinylacetate | 20 | Mainly water, traces of stabilizing surfactant | −0,60 | | |
| 15 | 30% of polybutadienestyrene | 20 | Mainly water, traces of stabilizing surfactant gelatin | −0,28 | gelatin | 2.5 |
| 16 | 30% of polybutadienestyrene | 20 | Mainly water, traces of stabilizing surfactant gelatin | 6, −0,7 | potassium chloride | 0.25 |
| 17 | 30% of polybutadienestyrene | 20 | Mainly water, traces of stabilizing surfactant | −0.4 | Vulcanizing group* | 8.5 |
| 18 | Collagen | 5 | Mainly water | −0.1 | | |
| 19 | Collagen | 5 | Mainly water | −0.1 | Glutaric dialdehyde | 10 |
| 20 | Collagen | 20 | 5% aqueous solution of tertbutanol | 0 | | |
| 21 | Collagen | 20 | 5% aqueous solution of tertbutanol | 0 | Epichlorohydrin | 5 |
| 22 | Collagen | 20 | 5% aqueous solution of dimethylsulfoxide | 0 | | |
| 23 | Collagen | 20 | 5% aqueous solution of dimethylsulfoxide | 0 | Epichlorohydrin | 5 |
| 24 | Mixture of collagen with chromed collagen | 3.125 | Mainly water | −0.1 | | |
| 25 | Mixture of collagen with chromed collagen | 3.125 | Mainly water | −0.1 | Glutaric dialdehyde | |

| | Technological Characteristics of Claimed Process | | | | | |
|---|---|---|---|---|---|---|
| Example | freezing | | | seasoning | | thawing |
| No. 1 | T, °C. 8 | τ, h 9 | $V_1:V_2$ 10 | T, °C. 11 | τ, h 12 | T, °C. 13 |
| 1 | −60 | 0.5 | 8.1:1 | −60 | 3.5 | 70 |
| 2 | −60 | 0.5 | 6.5:1 | −60 | 3.5 | 50 |
| 3 | −60 | 0.5 | 6.3:1 | −60 | 3.5 | 20 |
| 4 | −15 | 1.5 | 9:1 | −5.5 | 10.5 | 20 |
| 5 | −60 | 0.5 | 8.5:1 | −60 | 3.5 | 20 |

TABLE-continued

| | | | | | | |
|---|---|---|---|---|---|---|
| 6 | −15 | 1.5 | 8.2:1 | −15 | 10.5 | 20 |
| 7 | −60 | 0.5 | 8.7:1 | −60 | 3.5 | 70 |
| 8 | −60 | 0.5 | 10.1:1 | −20 | 3.5 | 20 |
| 9 | −60 | 0.5 | 11:1 | −60 | 3.5 | 20 |
| 10 | −60 | 0.5 | 10.8:1 | −60 | 3.5 | 20 |
| 11 | −60 | 0.5 | 8.5:1 | −60 | 3.5 | 70 |
| 12 | −60 | 0.5 | 9.3:1 | 40 | 4.5 | 30 |
| 13 | −50 | 0.5 | 7.1:1 | −30 | 5.5 | 20 |
| 14 | −8 | 3.5 | 7:1 | −8 | 3.5 | 20 |
| 15 | −60 | 0.5 | 6.6:1 | −40 | 3.5 | 20 |
| 16 | −70 | 0.5 | 7.0:1 | −60 | 2.5 | 20 |
| 17 | −70 | 0.5 | 3.0:1 | −50 | 3.5 | 20 |
| 18 | −65 | 0.5 | 4.0:1 | −18 | 2.5 | 20 |
| 19 | −60 | 0.5 | 3:1 | −18 | 2.5 | 20 |
| 20 | −40 | 0.5 | 4.8:1 | −40 | 2.5 | 20 |
| 21 | −40 | 0.5 | 4.1:1 | −40 | 2.5 | 20 |
| 22 | −40 | 0.5 | 5:1 | −40 | 2.5 | 30 |
| 23 | −40 | 0.5 | 4.1:1 | −40 | 2.5 | 20 |
| 24 | −40 | 0.5 | 4.2:1 | −18 | 3.5 | 30 |
| 25 | −40 | 0.5 | 3.1:1 | −18 | 3.5 | 20 |

| | Characteristics of Claimed Porous Polymer Material | | |
|---|---|---|---|
| Example No. 1 | $\rho_r$, g/cm$^3$ 14 | Relation of micropores and macropores 15 | $\epsilon_i$, mm 16 |
| 1 | 0.765 | 1:30 | 1.8 |
| 2 | 0.360 | 1:5.5 | 3.7 |
| 3 | 0.358 | 1:5.5 | |
| 4 | 0.651 | 1:3.8 | 2.4 |
| 5 | 0.401 | 1:5 | 3.7 |
| 6 | 0.400 | | |
| 7 | 0.275 | 1:7 | 3.7 |
| 8 | 0.520 | 1:4.5 | 3.0 |
| 9 | 0.531 | 1:4 | 3.0 |
| 10 | 0.528 | 1:3.5 | |
| 11 | 0.515 | 1:4.2 | 3.0 |
| 12 | 0.542 | 1:3.8 | 2.8 |
| 13 | 0.605 | 1:3.5 | 4.2 |
| 14 | 0.430 | 1:4.5 | 4.1 |
| 15 | 0.382 | 1:6 | 2.5 |
| 16 | 0.365 | 1:6 | 3.1 |
| 17 | 0.342 | 1:7 | 2.0 |
| 18 | 0.242 | 1:3 | 5.0 |
| 19 | 0.211 | 1:3 | 4.8 |
| 20 | 0.251 | 1:3 | 4.5 |
| 21 | 0.223 | 1:3 | 4.3 |
| 22 | 0.248 | 1:3 | 4.8 |
| 23 | 0.225 | 1:3 | 4.5 |
| 24 | 0.240 | 1:4 | 4.2 |
| 25 | 0.202 | 1:4.5 | 4.0 |

*The vulcanizing group comprises (pts wt): sulfur 1.88; diphenylguanidine, 1,0; zinc diethyldithiocarbomate, 0.75; zinc mercaptobenzothiazolate, 0.75; zinc oxide, 3.75; leuconol, 0.37 ($\epsilon$ 8.5).

Figure 1B:
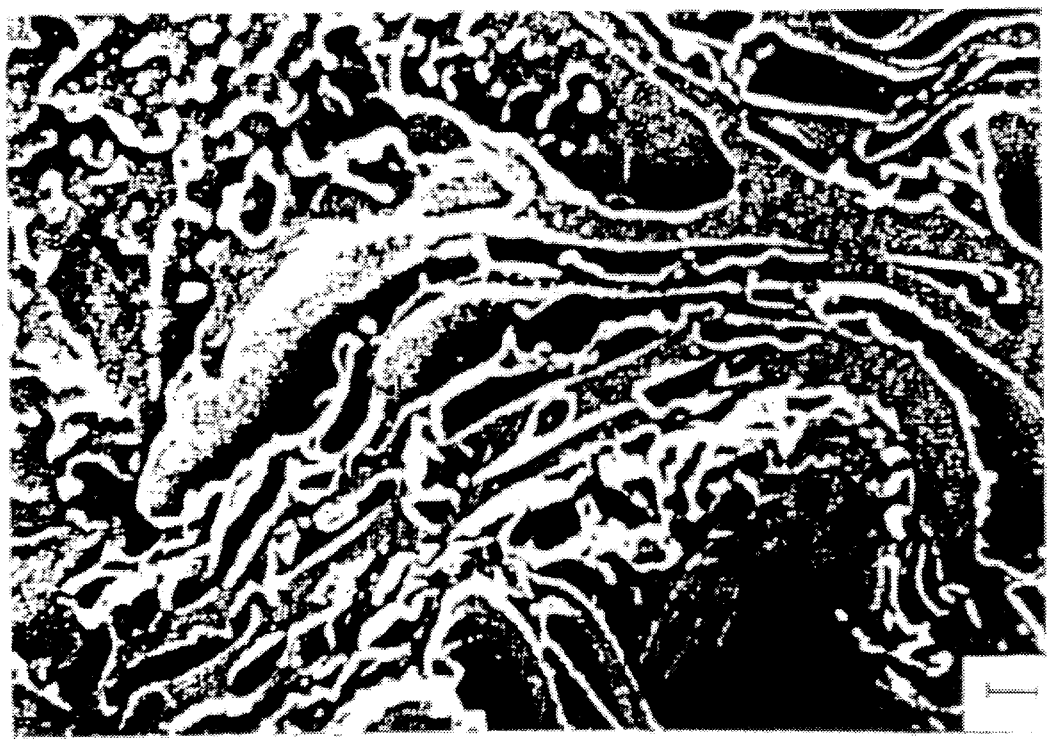
Figure 2A:
Figure 2B:
Figure 3A:
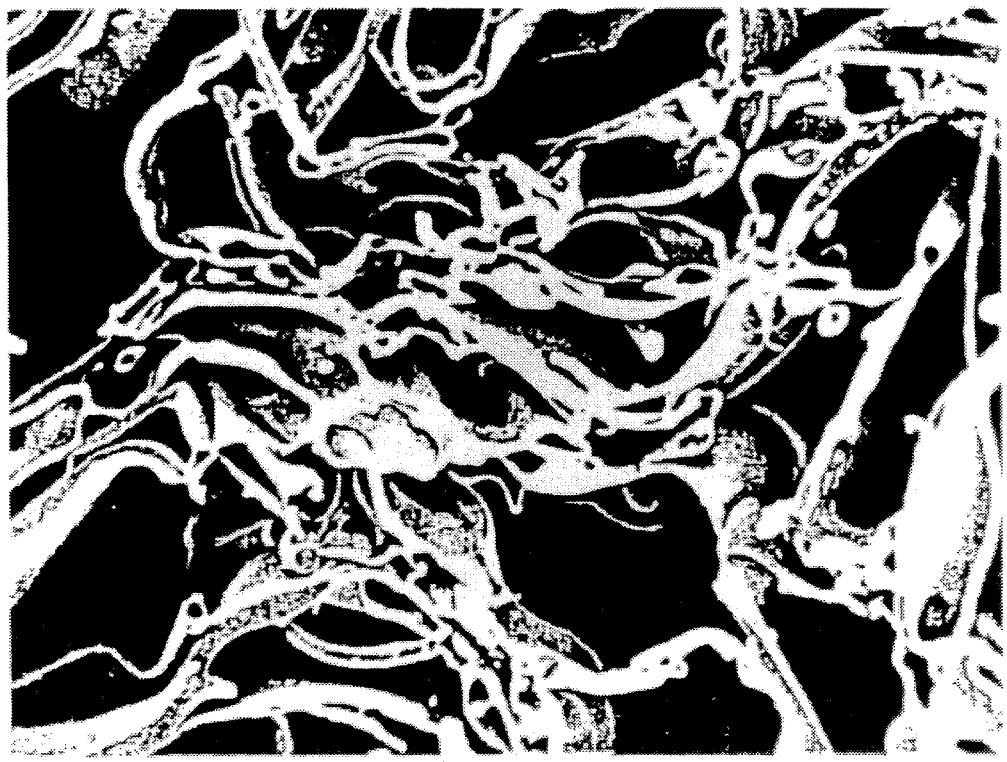
Figure 3B:
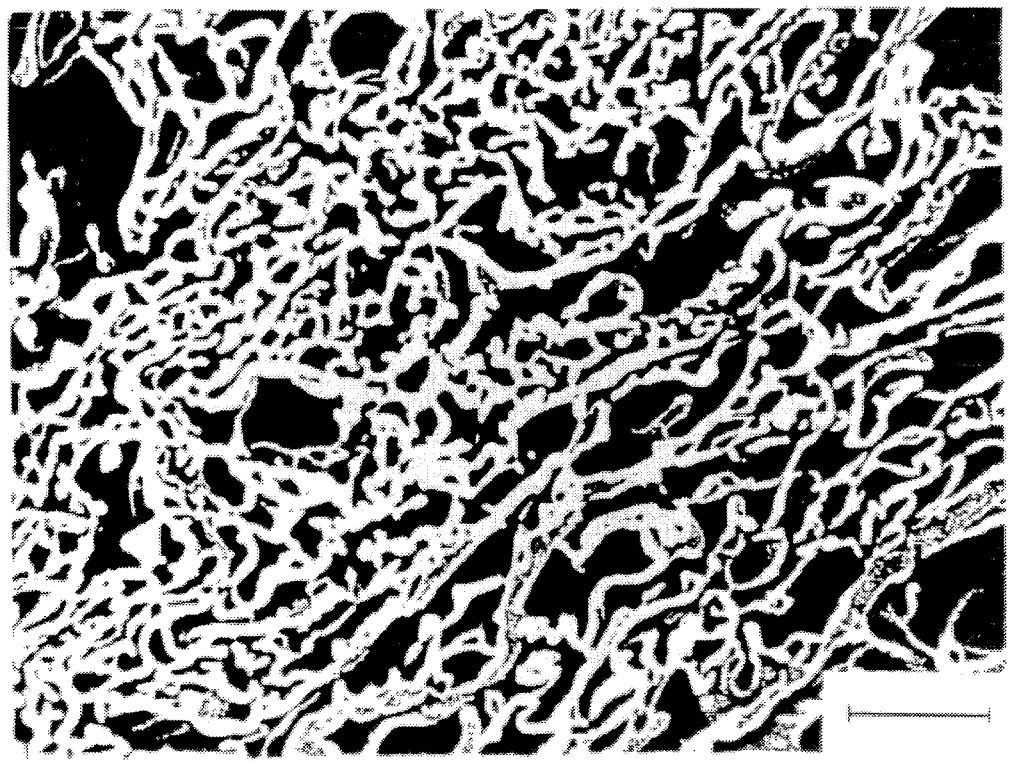
Figure 4A:
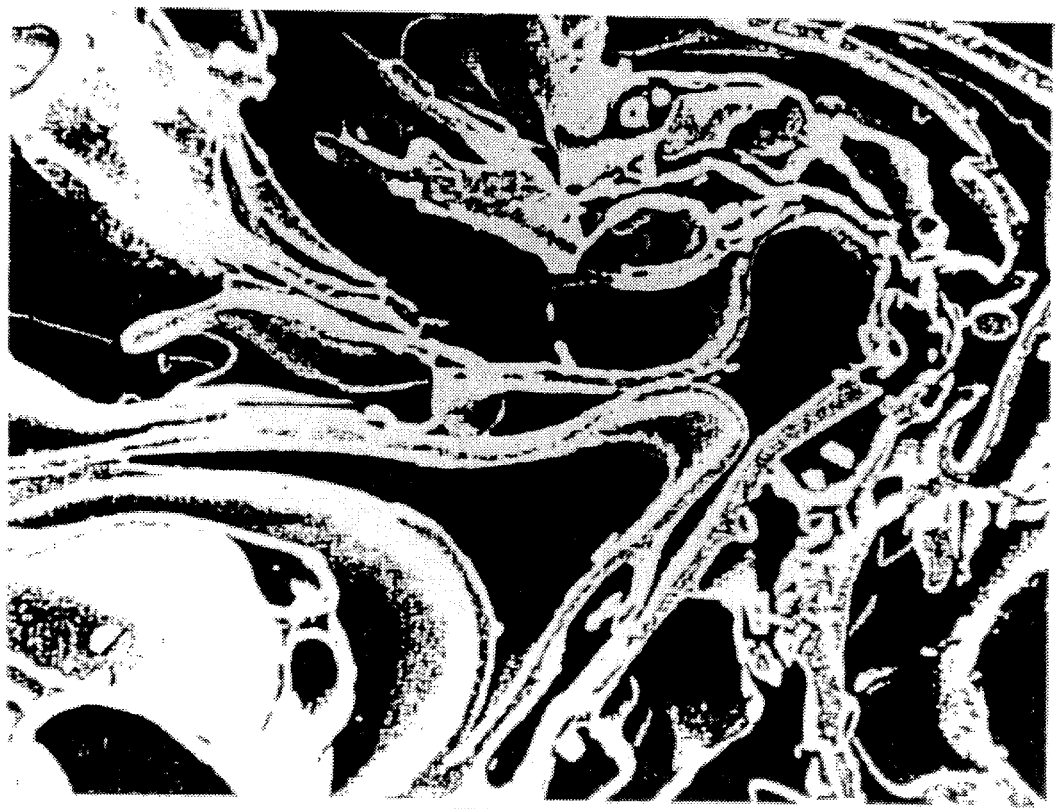
Figure 4B:
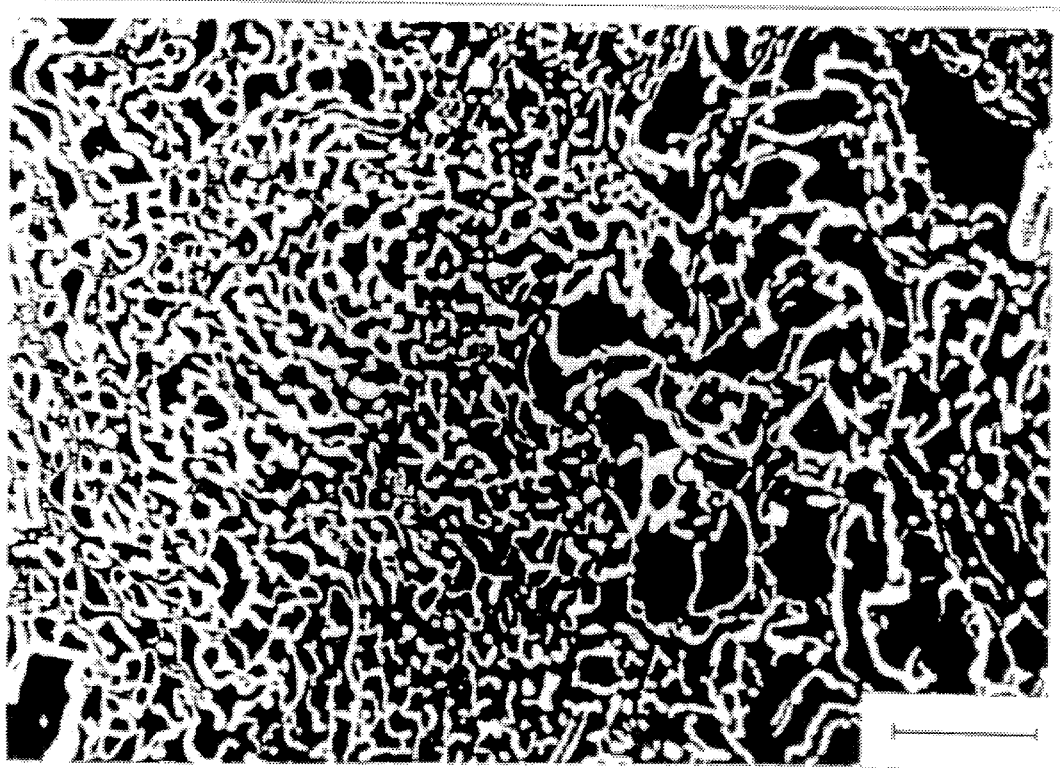
Figure 5A:
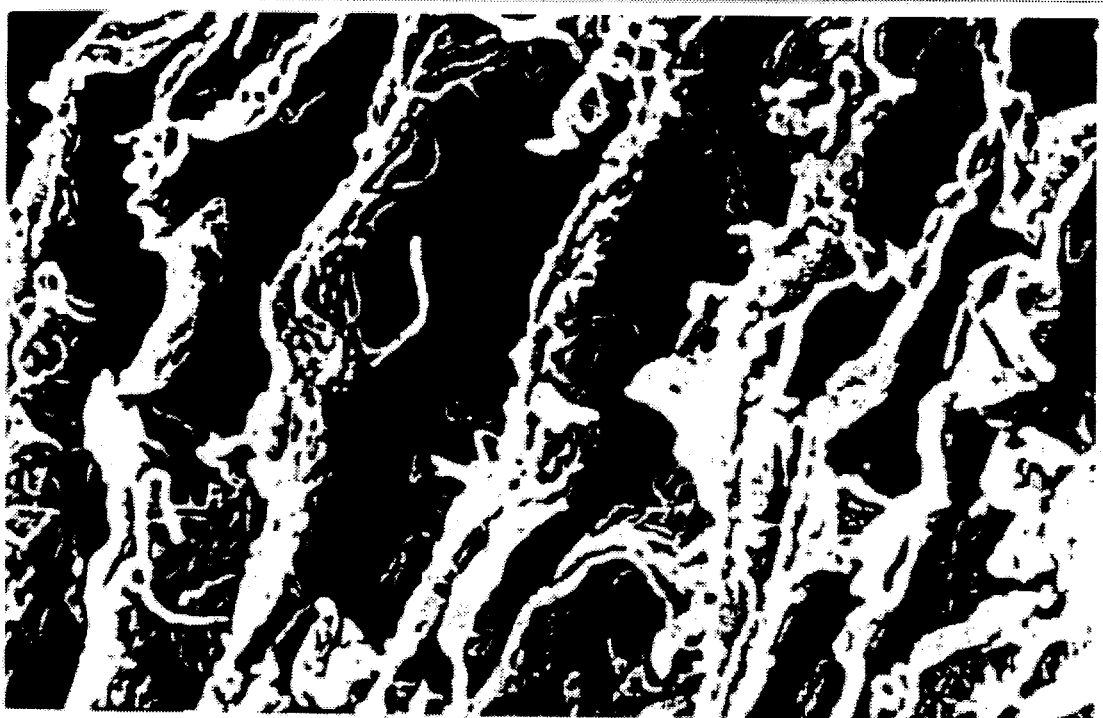
Figure 5B:
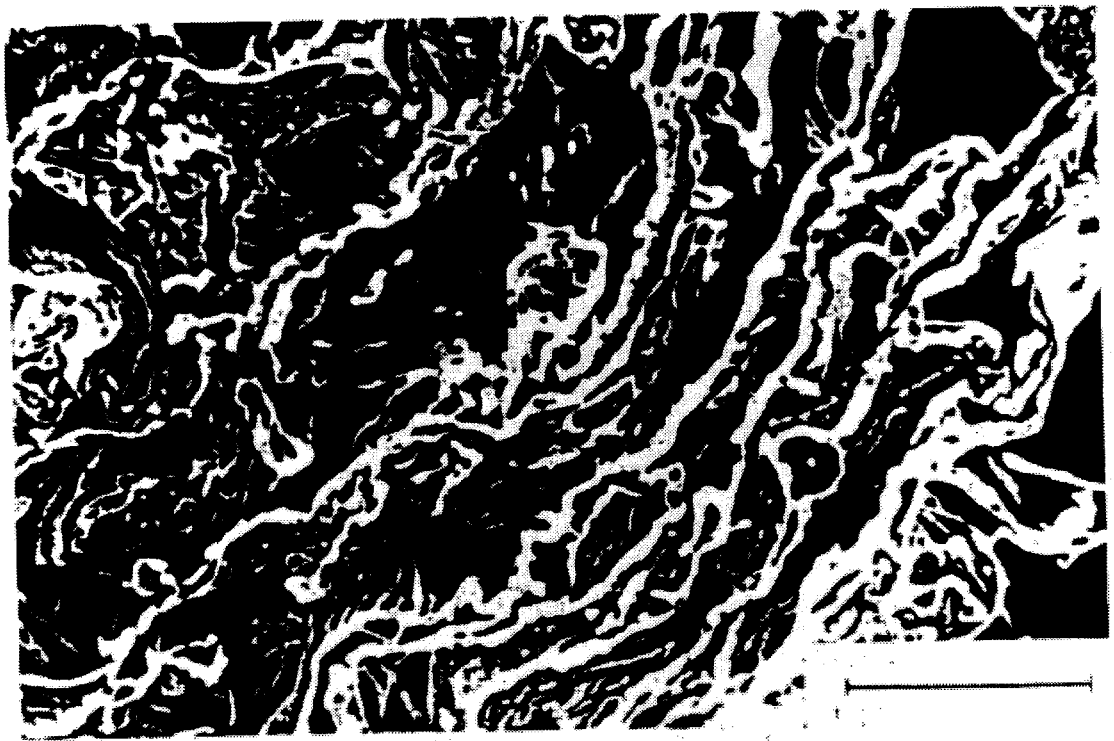

Microphotographs in FIGS. 1–5a illustrate the structure of peripheral portions of materials in Examples 1, 4, 5, 7, 25 composed mostly of anisodiametric macropores.

The scale for photomicrographs in FIGS. 1–5a corresponds to that in FIGS. 1–5b.

The photomicrographs in FIGS. 1–5b illustrate the central portions of the same materials composed mostly of micropores.

EXAMPLE 26

The porous polymer material is produced from a polymer dispersion wherein the polymer dispersed phase is constituted by polybutadienestyrene containing 30% of styrene units. Concentration of the polymer dispersed phase is 20 wt.-%. Said polymer dispersion contains also 1 pts wt of the filler, i.e. blue phthalocyanine pigment per 100 pts wt of polymer. The dispersion medium is mostly water with a small amount (up to 0.05 wt.-%) of potassium paraffinate acting as a stabilizing surfactant of the polybutadienestyrene aqueous dispersion. The initial melting point ($T_m$) of crystals in the dispersion medium determined from a thermogram is minus 0.28° C. A 200-g quantity of polymer dispersion is poured into a flat open glass container and placed into a cooling cabinet at minus 60° C. where it is frozen for 0.5 h to form a conjugate-dispersed system wherein the volume ratio of the polymer dispersed phase ($V_1$) to the noncrystallized dispersion medium ($V_2$) is 6.3:1. The resulting conjugate-dispersed system is seasoned at −50° C. for 3.5 h to the point of phase reversal when a specimen is formed from the reversed conjugate-dispersed system. The specimen is thawed at 70° C. The ratio of volumes $V_1:V_2$ equal to 6.3:1 is determined by the above-described methods. The difference between the volume of the dispersion medium in the polymeric dispersion (159 ml) and the volume of the liquid filling the pores of the thawed porous polymeric material (152.5 ml) is 6.5 ml ($V_2$). The volume of the polymer dispersed phase is about 41 ml ($V_2$), the density of the polymer phase being 0.98 g/cm$^3$. The micropore-to-macropore volume ratio found experimentally by geometric measurements is 1:5. The apparent density ($\rho_r$) of the material is 0.38 g/cm$^3$. The value of instantaneous deformation ($\epsilon_i$) is 3.5 mm.

EXAMPLE 27

The porous polymer material is produced from polymer dispersion whose polymer dispersed phase is polybutadienestyrene containing 30% of styrene units. Concentration of the polymer dispersed phase is 20 wt.-%. Said polymer dispersion also contains 250 pts wt of a filler—precipitated calcium carbonate—per 100 pts wt of polymer. The dispersion medium is mainly water. The initial melting point ($T_m$) of crystals in the dispersion medium found from a thermogram is minus 0.44° C. A 200-g portion of polymer dispersion is poured into a flat open glass container and placed into a cooling cabinet at minus 70° C. where it is frozen for 0.5 h to form a conjugate-dispersed system wherein the volume ratio of the polymer dispersed phase ($V_1$) to noncrystallized dispersion medium ($V_2$) is 4.1:1. The resultant conjugate-dispersed polymer system is held at minus 40° C. for 5.5 h to the point of phase reversal at which the specimen is formed from the reversed conjugate-dispersed system. The specimen is thawed at 70° C. The relation of volumes $V_1:V_2=4.1:1$ is determined as described above. The difference between the volume of dispersion medium in the polymer dispersion (60 ml) and that of liquid in the pores of the thawed porous polymer material (50 ml) is 10 ml ($V_2$). The volume of the polymer dispersed phase is about 41 ml ($V_2$), the density of the polymer phase being equal to 0.98 g/cm$^3$. Thus, the volume ratio of the polymer dispersed phase to the noncrystallized dispersion medium is 4.1:1. The coloured porous polymer material produced after thawing contains interrelated micro- and anisodiametric pores, the former occupying mostly the central part while the latter ones are distributed over peripheral portions 20 mm thick.

The volume ratio of micro- and macropores found experimentally by geometric measurements is 1:3. The apparent density of the material ($\rho_r$) is 0.942 g/cm$^3$. The instantaneous deformation ($\epsilon_i$) is 1.5 mm.

EXAMPLE 28

The porous polymer material with cells of microorganisms immobilized in its pores is produced from a polymer dispersion wherein the polymer dispersed phase is constituted by polybutadienestyrene containing 30% of styrene units. Concentration of the polymer dispersed phase is 20 wt.-%. Said polymer dispersion also contains cells of yeast *Saccharomyces cerevisae*. Said cells are introduced into the polymer dispersion in the form of a 5% aqueous suspension. The dispersion medium is mostly water with a small amount (up to 0.05 wt.-%) of dissolved potassium paraffinate which functions as a stabilizing surfactant of the polybutadienestyrene aqueous dispersion. The initial melting point ($T_m$) of the crystal of the dispersion medium found from a thermogram is minus 0.28° C. A quantity of 200 g of polymer dispersion is poured into a flat open glass container and placed into a cooling cabinet at a temperature of −40° C. where it is frozen for 1.0 h to form a conjugate-dispersed system wherein the volume ratio of the polymer dispersed phase ($V_1$) to the noncrystallized dispersion medium ($V_2$) is 7.4:1. The resultant conjugate-dispersed polymer system is held at minus 40° C. for 3 h to the point of reversal of phases at which the specimen is formed from the reversed conjugate-dispersed system. Then the specimen is thawed at 70° C. The ratio of volumes $V_1:V_2$ equal to 7.4:1 is determined by the above-described method. The difference between the volume of the dispersion medium in the polymer dispersion (150 ml) and that of the liquid contained in the pores of the thawed porous polymer material (153.5 ml) is 5.5 ml ($V_2$). The volume of the polymer dispersed phase is about 41 ml ($V_2$), the density of the polymer phase being 0.98 g/cm$^3$. Thus, the volume ratio of the polymer dispersed phase to the noncrystallized dispersion medium is 7.4:1. The coloured porous polymer material produced after thawing has interrelated micro- and anisodiametric pores of which the former ones are located mostly in the central part while the latter ones, on the peripheral sections 20 mm thick.

The volume ratio of micro- and macropores found experimentally by geometric measurements is 1:5. The apparent density ($\rho_r$) of the material is 0.384 g/cm$^3$ and the instantaneous deformation ($\epsilon_i$) is 3.5 mm.

Part of pores of the porous polymer material produced after thawing is filled with cells of said microorganisms. The relative productivity of immobilized cells is determined as the ratio of their total productivity in a flow-through reaction vessel for biosynthesis of yeast acidic phosphatase within 100 h of continuous operation to the total productivity of the same initial amount of biomass of said celle after 100 h of functioning in inoculation vessels. The relative productivity of the immobilized cells of *Saccharomyces cerevisial* is 0.8.

EXAMPLE 29

The porous polymer material is produced from a polymer dispersion of polybutadienestyrene containing 30% of styrene units. Concentration of the polymer dispersed phase is 20 wt.-%.

The processes of freezing and thawing are conducted as in Example 25. The specimen is thawed at 20° C. for 3 h until reversed dispersed polymer system turns into a wet porous polymer material. Then the material specimen discharged from the container and placed under a surplus unit pressure of 0.01 Pa. The thickness of the specimen after compulsory syneresis is 18 mm. On peripheral sections the produced porous polymer material mostly has macropores whose anisodiametric characteristic diminishes by 10% from the macropores shown in photomicrograph in FIG. 1a. However, the shape and size of micropores in the central part stay unchanged.

The volume ratio of micro- and macropores found experimentally by geometric measurements is 1:4.7. The apparent density of the material ($\rho_r$) is 0.372 g/cm$^3$ and the instantaneous deformation ($\epsilon_i$) is 3.1 mm.

INDUSTRIAL APPLICABILITY

The porous polymer material according to the invention will be quite useful in medicine, biotechnology for making cosmetic prostheses and immobilizing cells of microorganisms, in light industry for making footwear components, protection means for sportsmen, also in the capacity of heat-and-sound insulating materials utilized in various branches of engineering.

The process according to the invention can be used in the branches of industry where polymer dispersions serve as the main raw material, namely in rubber industry, production of plastic and building materials; polymer dispersions are obtained as byproducts of the main process, e.g. in woodworking or hide-and-skin industry.

We claim:

1. In a process for producing a porous polymer material comprising freezing a polymer dispersion to form a conjugate-dispersed system with subsequent treatment to produce a porous polymer material, the improvement wherein the polymer dispersion subjected to freezing contains a dispersion medium comprising an aqueous liquid which crystallizes upon freezing to form crystals having an initial melting point and a polymer dispersed phase capable of autohesion at a temperature lower than the initial melting point of crystals in the dispersion medium, said polymer dispersed phase comprising at least one polymer selected from the group consisting of polyisoprene, polybutadienestyrene, polymethylstyrene, polybutadienenitrile, polyacrylonitrile and collagen, the freezing being carried out at a freezing temperature sufficient for producing a conjugate-dispersed polymer system wherein the volume ratio of the polymer dispersed phase to noncrystallized dispersion medium is 3–11:1, the freezing temperature being lower than the initial melting point of crystals in the dispersion medium, the conjugate-dispersed system being maintained at a temperature lower than the initial melting point of crystals in the dispersion medium for a time period sufficient for a reversal of phases with the polymer dispersed phase turning into a dispersion medium and the dispersion medium turning into a dispersed phase whereby to form a reversed conjugate-dispersed polymer system, and thawing said reversed conjugate-dispersed polymer system at a temperature which exceeds the initial melting point of crystals in the dispersed phase to produce the porous polymer material.

2. A process as claimed in claim 1 wherein the freezing is carried out at a temperature within a range of from minus 8° to minus 70° C.

3. A process as claimed in claim 1 wherein the conjugate-dispersed system is maintained at a temperature which is 5°–60° C. lower than the initial melting point of crystals in the dispersion medium.

4. A process as claimed in claim 1 wherein the thawing includes heating of the reversed conjugate-dispersed polymer system.

5. A process as claimed in claim 1 wherein the thawing is carried out at room temperature until the reversed conjugate-dispersed polymer system turns into a wet porous polymer material, said wet porous polymer material then being pressed at a pressure from 0.01 to 2.0 Pa.

6. A process as claimed in claim 1 wherein the polymer dispersed phase is present in the polymer dispersion in a concentration of from 0.1 to 65 wt.-%.

7. A process as claimed in claim 1 wherein the dispersion medium contains mainly water and water-soluble additions.

8. A process as claimed in claim 1 wherein the dispersion medium comprises an aqueous crystallizable solution of an organic liquid.

9. A process as claimed in claim 1 wherein said polymer dispersion contains a crosslinking agent.

10. A process as claimed in claim 1 wherein said polymer dispersion contains an inorganic or organic filler in an amount of 1 to 250 pts wt of the polymer dispersed phase.

11. A process as claimed in claim 1 wherein the polymer dispersion contains cells of microorganisms.

12. A process as claimed in claim 1 wherein the dispersion medium consists essentially of water.

13. A process as claimed in claim 1 wherein the dispersion medium consists essentially of water and a surfactant.

14. A process as claimed in claim 1 wherein the at least one polymer is collagen.

15. A process as claimed in claim 1 wherein the at least one polymer is polyisoprene, polybutadienestyrene, polymethylstrene, polybutadienenitrile, or polyacrylonitrile.

* * * * *